W. J. FINK.
SCALE.
APPLICATION FILED APR. 24, 1909.
953,522.
Patented Mar. 29, 1910.
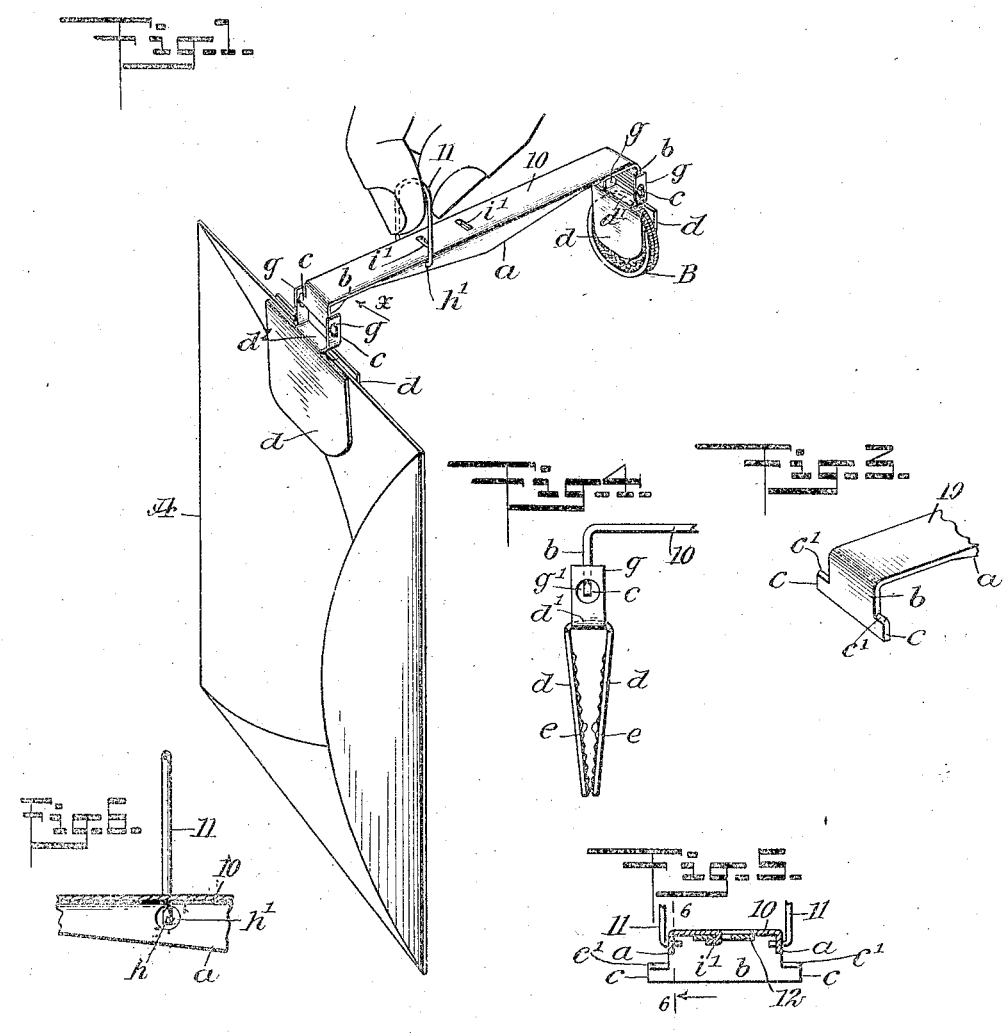
WITNESSES
INVENTOR
Willis J. Fink
BY
ATTORNEYS

UNITED STATES PATENT OFFICE.

WILLIS J. FINK, OF ELK POINT, SOUTH DAKOTA.

SCALE.

953,522.

Specification of Letters Patent. Patented Mar. 29, 1910.

Application filed April 24, 1909. Serial No. 491,895.

*To all whom it may concern:*

Be it known that I, WILLIS J. FINK, a citizen of the United States, and a resident of Elk Point, in the county of Union and State of South Dakota, have invented a new and Improved Scale, of which the following is a full, clear, and exact description.

This invention relates to scales used for weighing letters or the like, to determine the cost of postage, and has for its object to provide novel, simple details of construction for a letter scale, which is adapted for the use of a coin or coins representing the cost of postage for a letter of minimum weight, to determine if such a letter has excess of weight over that which the coins used as a weight will pay the postage on.

The invention consists in the novel construction and combination of parts, as is hereinafter described, and defined in the appended claims.

Reference is to be had to the accompanying drawings forming a part of this specification, in which similar characters of reference indicate corresponding parts in all the views.

Figure 1 is a perspective view of the improved scale and its application for weighing a letter; Fig. 2 is a reversed plan view of the scale beam; Fig. 3 is an enlarged perspective view of an end portion of the scale beam, seen in direction of the arrow $x$, in Fig. 1; Fig. 4 is an enlarged end view of a letter holding clasp, and a side view of an end portion of the scale beam loosely connected therewith, seen in direction of the arrow $x$ in Fig. 1; Fig. 5 is a transverse sectional view of the scale beam and of an adjustable weight thereon, taken substantially on the line 5—5 in Fig. 2; and Fig. 6 is an enlarged transverse sectional view, substantially on the line 6—6 in Fig. 5.

In the drawings that represent the construction and application of the device, 10 represents a beam for the scale, which, for lightness and economy in manufacturing, is preferably cut from a strip of thin plate metal having proper length and width, and at each side a depending flange $a$ is bent thereon, which flanges stiffen the beam, and adapt it to preserve its form when in service.

The improved scale may be proportioned for weighing letters of various weights, that are to be counterbalanced by one or more coins of a value that will cover the cost of postage on said letter or on a package. In this example of the application of the invention, the two cent rate for a letter of the minimum weight of one ounce, is adopted as a basis for illustrating the use of, and convenience afforded by the improvement. On each end of the beam 10 a depending flat limb $b$ is formed, by bending the material at or near a right angle, and on each of said downwardly projected limbs, at opposite points on the side edges thereof, outwardly projecting bearings $c$ are formed, which have inverted V-shaped upper edges $c'$ thereon, as clearly shown for one limb $b$ in Fig. 3. Two similar clasps for gripping a letter A and coins B are provided for connection with the limbs $b$. Each clasp is formed of a single piece of resilient plate metal, that is shaped to provide two similar flat jaws $d$, $d$, that are connected together by a web $b'$, that is retrun bent as is indicated by a dotted line in Fig. 4, where one clasp is shown. The jaws $d$ may have roughened inner surfaces, as is represented in Fig. 4 at $e$, and to give them proper bearing on a letter or coins the jaws of each clasp are inclined toward each other, so as to cause their free ends to engage each other.

At each transverse edge of a connecting web $d'$ on a clasp, an upwardly projected flange $g$ is formed, and in each pair of said flanges $g$ opposite perforations $g'$ are produced which perforations receive respective knife edged bearings $c$ that are inserted therethrough outwardly, when a depending limb $b$ on one end of the beam 10 is introduced between the flanges $g$.

It will be seen that when the clasps that have been described are respectively mounted upon the depending limbs $b$, they will be adapted to grip a letter A and hold it connected with one end of the beam 10, and one or more coins B of a proper value be clamped between the jaws of the clasp on the opposite end of said scale beam.

A means for suspending the beam 10 so as to enable the use of the scale for weighing a letter or the like, is shown, and consists of a bail-shaped handle 11, the limbs of which are disposed parallel with each other, and on the free ends of said limbs opposite knife edged bearings $h$ are formed that project toward each other. Assuming that the letter A, which is clasped and held pendent at one end of the beam 10, weighs an ounce, and that the coins "two cents" which represent the cost of postage required to entitle the letter to be carried in the mail, are clasped between the jaws d of the clasp at the opposite end of the beam, the handle 11 must be engaged with the beam or depending flanges a thereon, at a point that will cause the beam 10 to assume an exact horizontal position when said beam, with the letter and coins thereon, is held suspended by said handle. To this end, the point of suspension for the beam must be arranged nearer to the letter clasp than is the coin clasp, the difference in weight between the letter and coins determining said point, and to enable a proper engagement of the handle with the beam, opposite perforations such as h' in Fig. 6 are formed in the depending flanges a, which perforations receive respective bearings h on the handle 11, said knife edged bearings being inserted from the outer sides of the flanges therethrough.

It will be obvious that if the scale is constructed as hereinbefore described, and the coins B representing the value of a two cent letter stamp are placed in the clasp at the right hand end of the beam, as represented in Fig. 1, if the coins overbalance a letter A, held in the other clasp, or the beam is disposed level, the letter will be carried if a two cent stamp is placed thereon.

To facilitate the exact adjustment for weight to be carried at opposite ends of the scale beam 10, an adjustable poise, such as a slide bar 12, may be provided. The poise 12 is in the form of a flat bar, cut from plate metal, having proper length for its service, and has a longitudinal slot i therein. Integral with the flat body of the beam 10 at a suitable distance apart, two lugs i' are cut out from the plate forming said body, and bent downward and then laterally, so as to hook over the opposite edges of the slot i, as shown in Figs. 2 and 5, said lugs having a frictional contact with the lower side of the adjustable poise 12, sufficient to prevent its accidental sliding movement. It will be seen that if the perforations h' are not formed at the exact point for a proper weighing of a letter, the poise 12 may be slid endwise, so as to dispose the beam 10 in exact balance, when hung from the handle 11 and the proper coin together with a letter of correct weight are hung from the beam.

Having thus described my invention, I claim as new and desire to secure by Letters Patent:

1. The combination with a scale beam provided with bearing surfaces at each end, of a clasp pendent from each end of the scale beam, each clasp comprising flat jaws, a member connecting the jaws at their upper ends, and spaced members extending upwardly from said connecting member and adapted to engage said bearing surfaces.

2. The combination with a scale beam formed of plate metal, and having a pendent flange on each side edge thereof, said flanges each having a perforation, of a bail-shaped handle having its limbs disposed parallel with each other, the free ends of said limbs having opposite knife edged bearings that loosely engage with said perforations.

3. A scale, embodying a plate metal beam, a depending flange on each side edge of the beam, each of said flanges having a perforation, the perforation being disposed oppositely and nearer one end of the beam than the other end, a depending flat limb on each end of the beam, a depending clasp loosely hung from each depending limb, and a handle in staple form having an inwardly turned edged bearing on each lower end thereof, said bearings loosely engaging within the perforations in the flanges on the beam.

4. The combination with a scale beam, a looped handle loosely engaged with the beam near one end thereof, and a clasp pendent from each end of the beam, of a poise adjustably secured on the beam and movable toward either end of the beam.

5. In a letter scale, a rockably hung beam, a clasp hung on one end of said beam, and comprising jaws adapted to receive between them coins that represent the value of a postage stamp, and a clasp pendent from the opposite end of the beam, and compressing jaws adapted to grip and hold a letter, the weight of which is counterbalanced by the coins, and which the postage stamp will carry in the mail.

6. The combination with a scale beam having a depending limb on each end provided with projecting bearings at its side edges, of a clasp pendent from each limb of the scale beam, each clasp comprising flat jaws connected together by a web, and flanges projecting upwardly from the web and having opposite perforations adapted to receive the said bearings.

7. The combination with a scale beam, a clasp pendent from each end of said beam, and means for suspending the beam, of an adjustable poise comprising a flat metal bar having a longitudinal slot, the said scale beam being provided with lugs extending through the slot and having a frictional contact with the poise.

In testimony whereof I have signed my name to this specification in the presence of two subscribing witnesses.

WILLIS J. FINK.

Witnesses:
E. C. ERICSON,
BLANCHE SAGEN.